US012720612B2

(12) United States Patent
Lin et al.

(10) Patent No.: US 12,720,612 B2
(45) **Date of Patent: *Aug. 25, 2026**

(54) METHOD AND APPARATUS FOR RANDOM ACCESS

(71) Applicant: Telefonaktiebolaget LM Ericsson (publ), Stockholm (SE)

(72) Inventors: Zhipeng Lin, Nanjing (CN); Johan Axnäs, Solna (SE); Robert Karlsson, Sundbyberg (SE); Asbjörn Grövlen, Stockholm (SE); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 86 days.

This patent is subject to a terminal disclaimer.

(21) Appl. No.: 18/739,270

(22) Filed: Jun. 10, 2024

(65) Prior Publication Data

US 2024/0334499 A1 Oct. 3, 2024

Related U.S. Application Data

(63) Continuation of application No. 17/427,029, filed as application No. PCT/CN2020/073858 on Jan. 22, 2020, now Pat. No. 12,041,669.

(30) Foreign Application Priority Data

Jan. 30, 2019 (WO) ................ PCT/CN2019/073983

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/0453* (2013.01);
(Continued)

(58) Field of Classification Search
CPC ... H04B 17/318; H04B 17/328; H04W 48/10; H04W 48/12; H04W 72/04;
(Continued)

(56) References Cited

U.S. PATENT DOCUMENTS 10,433,342 B2 10/2019 Akkarakaran et al.
11,546,813 B2 * 1/2023 Park ................. H04W 36/0077
(Continued)

FOREIGN PATENT DOCUMENTS

CN 108282895 A 7/2018
CN 108282901 A 7/2018
(Continued)

OTHER PUBLICATIONS

Asustek, Consideration on fallback of 2-step RACH procedure, 3GPP TSG-RAN WG2 Meeting #NR Ad Hoc, R2-1700358, 4 pages, Jan. 17-19, 2017.
(Continued)

*Primary Examiner* — Frank Duong
(74) *Attorney, Agent, or Firm* — Nicholson De Vos Webster & Elliott LLP

(57) ABSTRACT

Methods and apparatuses for random access. A method performed by a terminal device comprises determining a random access procedure to be performed, the random access procedure being one of a two-step random access procedure and a four-step random access procedure, and transmitting a request message for random access in the determined random access procedure.

16 Claims, 11 Drawing Sheets

(51) Int. Cl.

| | |
|---|---|
| ***H04W 72/0453*** | (2023.01) |
| ***H04W 74/00*** | (2009.01) |
| ***H04W 74/08*** | (2009.01) |
| ***H04W 74/0836*** | (2024.01) |

(52) U.S. Cl.

CPC ..... *H04W 74/006* (2013.01); *H04W 74/0833* (2013.01); *H04W 74/0836* (2024.01); *H04W 74/0866* (2013.01)

(58) Field of Classification Search

CPC ......... H04W 72/0446; H04W 72/0453; H04W 72/21; H04W 72/23; H04W 74/002; H04W 74/004; H04W 74/006; H04W 74/008; H04W 74/04; H04W 74/0841; H04W 74/0833; H04W 74/0866; H04W 76/11

See application file for complete search history.

(56) References Cited

U.S. PATENT DOCUMENTS

| | | | | |
|---|---|---|---|---|
| 2016/0029358 | A1 | 1/2016 | Hou et al. | |
| 2018/0110074 | A1 | 4/2018 | Akkarakaran et al. | |
| 2018/0110075 | A1* | 4/2018 | Ly | H04W 74/0833 |
| 2018/0139787 | A1 | 5/2018 | Islam et al. | |
| 2018/0227805 | A1 | 8/2018 | Jang et al. | |
| 2018/0279186 | A1 | 9/2018 | Park et al. | |
| 2018/0279375 | A1 | 9/2018 | Jeon et al. | |
| 2018/0279376 | A1 | 9/2018 | Dinan et al. | |
| 2019/0075598 | A1 | 3/2019 | Li et al. | |
| 2019/0335515 | A1 | 10/2019 | Chen et al. | |
| 2019/0357265 | A1 | 11/2019 | Ren et al. | |
| 2022/0053575 | A1* | 2/2022 | He | H04W 56/004 |

FOREIGN PATENT DOCUMENTS

| | | | |
|---|---|---|---|
| EP | 3358901 | A1 | 8/2018 |
| WO | 2018/085428 | A1 | 5/2018 |
| WO | 2018/089265 | A1 | 5/2018 |
| WO | 2018/127240 | A1 | 7/2018 |
| WO | 2018/127244 | A1 | 7/2018 |
| WO | 2018/127549 | A1 | 7/2018 |

OTHER PUBLICATIONS

Communication pursuant to Article 94(3) EPC, EP App. No. 20747756.3, Jan. 29, 2024, 6 pages.

Communication pursuant to Article 94(3) EPC, EP App. No. 20747756.3, Jun. 20, 2023, 5 pages.

Examination Report, IN App. No. 202147038435, Aug. 10, 2022, 6 pages.

Interdigital Communications, "2-Step Random Access Procedure in NR", Jan. 17-19, 2017, 3 pages, 3GPP TSG-RAN WG2 NR Ad Hoc, R2-1700237.

International Preliminary Report on Patentability (Chapter II), PCT App. No. PCT/CN2020/073858, May 11, 2021, 20 pages.

International Search Report and Written Opinion for Application No. PCT/CN2020/073858, dated Apr. 22, 2020, 9 pages.

Non-Final Office Action, U.S. Appl. No. 17/427,029, Oct. 20, 2023, 20 pages.

Notice of Allowance, U.S. Appl. No. 17/427,029, Mar. 8, 2024, 8 pages.

Notice of Allowance, U.S. Appl. No. 17/427,029, May 15, 2024, 3 pages.

Supplementary European Search Report and Search Opinion, EP App. No. 20747756.3, Aug. 29, 2022, 8 pages.

* cited by examiner

METHOD AND APPARATUS FOR RANDOM ACCESS

CROSS-REFERENCE TO RELATED APPLICATIONS

This application is a continuation of application Ser. No. 17/427,029, filed Jul. 29, 2021, which is a National stage of International Application No. PCT/CN2020/073858, filed Jan. 22, 2020, which claims priority to International Application No. PCT/CN2019/073983, filed Jan. 30, 2019, which are all hereby incorporated by reference.

FIELD OF THE INVENTION

The present disclosure generally relates to wireless communications, and more specifically, to methods and apparatuses for random access.

BACKGROUND

This section introduces aspects that may facilitate a better understanding of the disclosure. Accordingly, the statements of this section are to be read in this light and are not to be understood as admissions about what is in the prior art or what is not in the prior art.

In a new radio (NR) system, a four-step approach may be used for a random access procedure, as shown in FIG. 1. In this approach, a user equipment (UE) detects a synchronization signal (SS) which comprises NR-primary synchronization signal (NR-PSS), NR-secondary synchronization signal (NR-SSS) and NR-physical broadcast channel (PBCH), and decodes broadcasted system information, e.g. remaining minimum system information (RMSI). Then the UE may transmit a physical random access channel (PRACH) preamble (message 1) in uplink (UL). In response to receiving the message 1, a base station (e.g. next generation node B (gNB)) replies with a random access response (RAR, message 2). The RAR message is octet aligned and may comprise a timing advance (TA) command, a UL grant, and a temporary cell-radio network temporary identifier (TC-RNTI).

After receiving the RAR message, the UE may transmit a message 3 including a UE identification and a transport block on a physical uplink shared channel (PUSCH). The gNB then replies with a contention resolution message (message 4). The timing advance command in the RAR message allows the message 3 PUSCH to be received with a timing accuracy within a cyclic prefix (CP). Without this timing advance, a very large CP would be needed in order to be able to demodulate and detect the PUSCH, unless the system is applied in a cell with a very small distance between the UE and the gNB. Since NR will also support larger cells with a need for providing a timing advance to the UE, the four-step approach is needed for the random access procedure.

A two-step random access procedure has been approved as a work item for NR release 16. As illustrated in FIG. 2, an initial access is completed in only two steps. At the first step, the UE sends a message, which may be called message A, including a random access preamble together with higher layer data such as radio resource control (RRC) connection request possibly with some small payload on PUSCH. At the second step, the gNB sends to the UE a response message, which may be called message B, including e.g. UE identifier assignment, TA information, and contention resolution message, etc.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure proposes an improved solution for random access.

According to a first aspect of the present disclosure, there is provided a method performed by a terminal device. The method comprises determining a random access procedure to be performed. The random access procedure is one of a two-step random access procedure and a four-step random access procedure. The method further comprises transmitting a request message for random access in/with the determined random access procedure. With the method, the terminal device can select an appropriate random access procedure to perform random access.

In accordance with an exemplary embodiment, the random access procedure to be performed may be determined according to a random access type indication received from a network node, the random access type indication indicating a random access procedure that the terminal device can use.

In accordance with an exemplary embodiment, the random access type indication may be received in downlink control information.

In accordance with an exemplary embodiment, the random access type indication may be received via radio resource control, RRC, signaling.

In accordance with an exemplary embodiment, the random access procedure to be performed may be determined based on at least one of followings: a measurement on a downlink signal or channel, a type of service for which the terminal device is in operation, a frequency band on which the terminal device is operating, a number of random access failures, a coverage of the network node, an availability of a physical uplink shared channel, PUSCH, resource to be used for a two-step random access procedure, and a moving speed of the terminal device.

In accordance with an exemplary embodiment, the random access type indication may indicate that both two-step random access procedure and four-step random access procedure can be used by the terminal device. In the embodiment, the random access procedure to be performed may be determined further based on at least one of followings: a measurement on a downlink signal or channel, a type of service for which the terminal device is in operation, a frequency band on which the terminal device is operating, a number of random access failures, a coverage of the network node, an availability of a physical uplink shared channel, PUSCH, resource to be used for a two-step random access procedure, and a moving speed of the terminal device.

In accordance with an exemplary embodiment, the method may further comprise receiving, in response to transmitting the request message, a response message from the network node, the response message indicating a random access procedure to be used by the terminal device for a subsequent random access.

In accordance with an exemplary embodiment, the response message may further comprise at least one of the preamble in the request message, TA information, and a random access failure cause.

In accordance with an exemplary embodiment, the TA information may be used for a subsequent two-step random access procedure.

In accordance with an exemplary embodiment, the response message may be received on a physical downlink shared channel, PDSCH, or a physical downlink control channel, PDCCH.

In accordance with an exemplary embodiment, when the random access procedure to be performed is determined as the two-step random access procedure, the request message may comprise a preamble and a PUSCH.

In accordance with an exemplary embodiment, when the random access procedure to be performed is determined as the two-step random access procedure, the request message may comprise a PUSCH with a demodulation reference signal, DMRS.

In accordance with an exemplary embodiment, the PUSCH may be of a channel structure carrying information with or without a demodulation reference signal, DMRS.

According to a second aspect of the present disclosure, there is provided a method performed by a network node. The method comprises receiving, from a terminal device, a request message for random access in a random access procedure, and determining whether the random access procedure is a two-step random access procedure or a four-step random access procedure based on the request message. The method further comprises transmitting, to the terminal device, a response message according to the determination.

In accordance with an exemplary embodiment, determining whether the random access procedure is a two-step random access procedure or a four-step random access procedure based on the request message may comprise: determining whether a PUSCH is received in a PUSCH resource for a two-step random access procedure; determining, in response to the determination that the PUSCH is received in the PUSCH resource for the two-step random access procedure, that the random access procedure is the two-step random access procedure; and determining, otherwise, that the random access procedure is the four-step random access procedure.

In accordance with an exemplary embodiment, the method may further comprise determining, in response to successfully detecting a preamble in the request message and failing to decode a PUSCH in the request message, a random access procedure to be used by the terminal device for a subsequent random access, and transmitting the response message indicating the determined random access procedure.

In accordance with an exemplary embodiment, the random access procedure may be determined based on at least one of followings: a measurement on an uplink signal, a frequency band on which the terminal device is operating, a number of random access failures, a coverage of the network node, an availability of a PUSCH time-frequency resource to be used for a two-step random access procedure, and a PUSCH decoding status.

In accordance with an exemplary embodiment, the response message may further comprise at least one of the preamble in the request message, TA information, and a random access failure cause.

In accordance with an exemplary embodiment, the response message may be transmitted on a PDSCH or a PDCCH.

In accordance with an exemplary embodiment, the method may further comprise transmitting a random access type indication to the terminal device, the random access type indication indicating a random access procedure that the terminal device can use.

In accordance with an exemplary embodiment, the random access type indication may be transmitted in downlink control information.

In accordance with an exemplary embodiment, the random access type indication may be transmitted via RRC signaling.

According to a third aspect of the present disclosure, there is provided a terminal device. The terminal device may comprise one or more processors and one or more memories comprising computer program codes. The one or more memories and the computer program codes may be configured to, with the one or more processors, cause the terminal device at least to perform any step of the method according to the first aspect of the present disclosure.

According to a fourth aspect of the present disclosure, there is provided a computer-readable medium having computer program codes embodied thereon which, when executed on a computer, cause the computer to perform any step of the method according to the first aspect of the present disclosure.

According to a fifth aspect of the present disclosure, there is provided a network node. The network node may comprise one or more processors and one or more memories comprising computer program codes. The one or more memories and the computer program codes may be configured to, with the one or more processors, cause the network node at least to perform any step of the method according to the second aspect of the present disclosure.

According to a sixth aspect of the present disclosure, there is provided a computer-readable medium having computer program codes embodied thereon which, when executed on a computer, cause the computer to perform any step of the method according to the second aspect of the present disclosure.

According to some embodiments of the present disclosure, a terminal device and a network node can determine to perform which random access procedure for random access. Moreover, according to some embodiments, the terminal device and the network node can switch the random access from the two-step random access procedure to the four-step random access procedure or vice versa.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
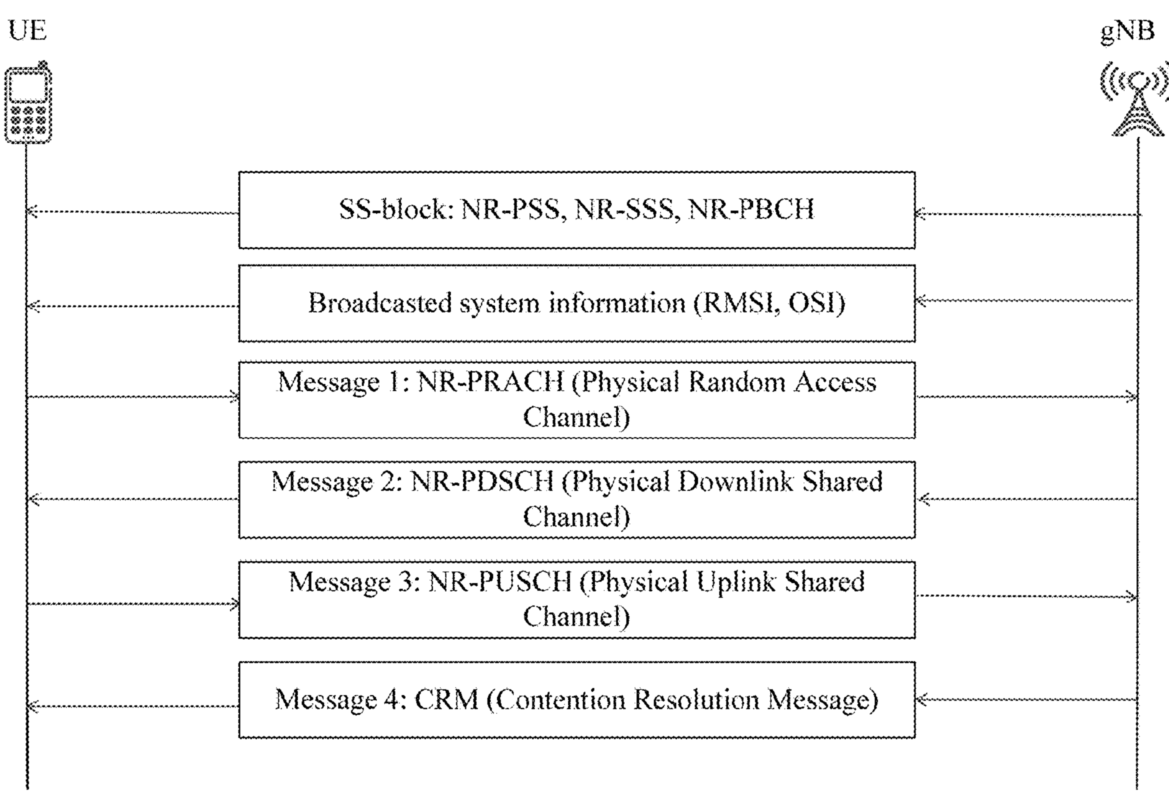
FIG. 1 is a diagram illustrating a four-step random access procedure in NR.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node or network device may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), an IAB node, a remote radio unit (RRU), a radio header (RH), a remote radio head (RRH), a relay, a low power node such as a femto, a pico, and so forth.

Yet further examples of the network device comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 2:
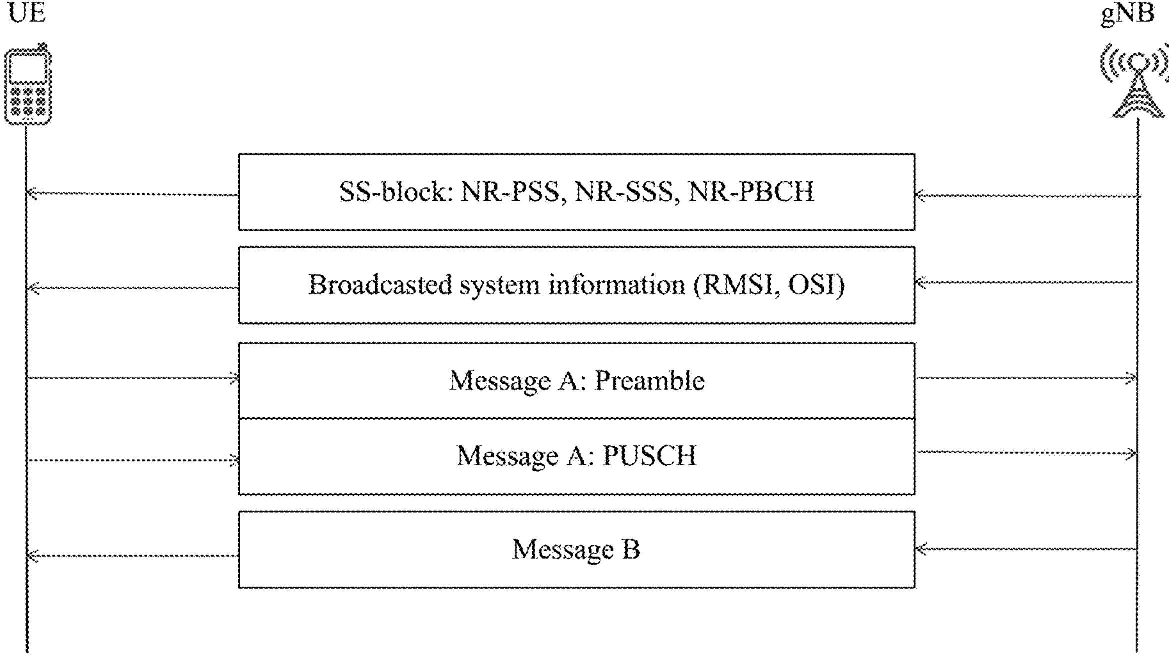
FIG. 2 is a diagram illustrating a two-step random access procedure in NR.

As described above, in the two-step random access procedure as shown in FIG. 2, the preamble and the PUSCH will be transmitted by the UE in one message called message A. In the four-step random access procedure, the message 3 PUSCH is transmitted only when a preamble is correctly detected and the message 2 is correctly received by the UE. Moreover, the two-step random access procedure may be preferred for time-critical services, and the four-step random access procedure may be preferred for services requiring reliable reception. In NR, both the two-step random access procedure and the four-step random access procedure can be supported. Therefore, it would be desirable to provide a solution for the UE and gNB to determine what random access procedure is used.

In accordance with some exemplary embodiments, the present disclosure provides an improved solution for random access. The solution may be applied to a wireless communication system including a terminal device and a base station. Prior to performing a random access, the terminal device may determine a random access procedure to be performed, and the random access procedure determined can be one of a two-step random access procedure and a four-step random access procedure. Then the terminal device may transmit a request message for random access in/with the determined random access procedure. Also, the base station can determine the random access procedure upon receipt of the request message for random access. With the improved solution, the terminal device and the base station can determine the random access procedure used for the random access.

It is noted that some embodiments of the present disclosure are mainly described in relation to 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 3:
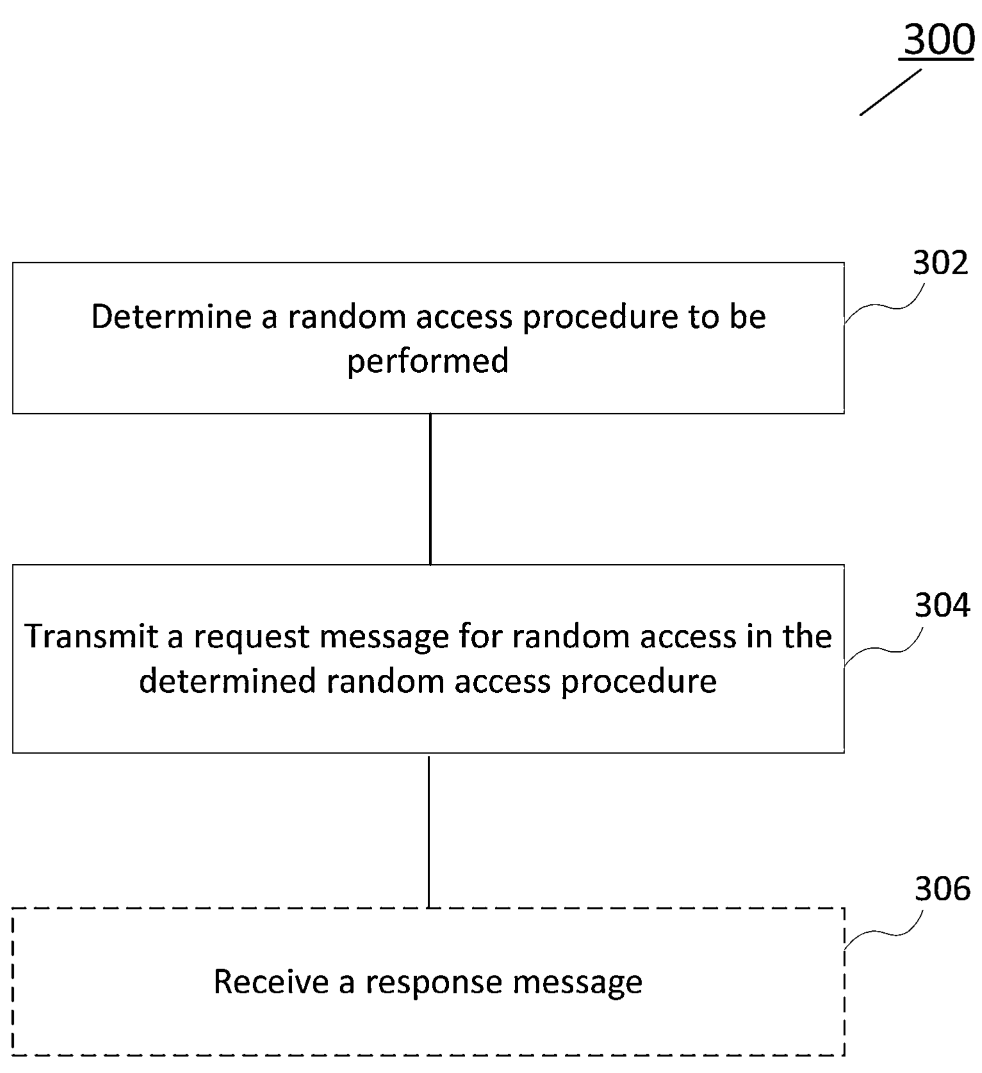
FIG. 3 is a flowchart illustrating a method performed by a terminal device according to some embodiments of the present disclosure.

FIG. 3 is a flowchart illustrating a method 300 according to some embodiments of the present disclosure. The method 300 illustrated in FIG. 3 may be performed by an apparatus implemented in/as a terminal device or communicatively coupled to a terminal device. In accordance with an exemplary embodiment, the terminal device may be a UE.

According to the exemplary method 300 illustrated in FIG. 3, the terminal device determines a random access procedure to be performed, as shown in block 302. The determined random access procedure is one of a two-step random access procedure or a four-step random access procedure. In some embodiments, the random access procedure may be determined according to a random access type indication. The random access type indication indicates a random access procedure that the terminal device can use.

In some embodiments, the random access type indication may be one bit. For example, if the bit is set to 0, the random access type indication indicates that only two-step random access procedure can be used. If the bit is set to 1, the random access type indication indicates that only four-step random access procedure can be used.

Alternatively, in some embodiments, the random access type indication may be two bits. In this case, for example, if the bits are set to 00, the random access type indication indicates that only two-step random access procedure can be used. If the bits are set to 01, the random access type indication indicates that only four-step random access procedure can be used. If the bits are set to 10, the random access type indication indicates that both two-step random access procedure and four-step random access procedure can be used.

In some embodiments, the random access type indication may be signaled from a network node such as a base station (e.g. a gNB). In an embodiment, the random access type indication may be included in downlink control information, DCI, and signaled in PDCCH. When the terminal device needs to initiate random access, the terminal device can determine what random access procedure to be used from the DCI. In another embodiment, the random access type indication may be signaled via RRC signaling. For example, the random access type indication may be included in system information and broadcasted in a RRC message.

In some embodiments, the terminal device may determine the random access procedure based on other one or more factors than the random access type indication.

In an embodiment, the terminal device may determine the random access procedure based on a measurement on a downlink (DL) signal or channel. In particular, the terminal device may measure a Reference Signal Receiving Power (RSRP) or Reference Signal Receiving Quality (RSRQ) in downlink. If the RSRP or RSRQ is lower than a threshold, the terminal device may determine to perform the two-step random access procedure. Otherwise, the four-step random access procedure is determined to be performed. The threshold may be predefined or may be configured via a signaling message.

In another embodiment, the terminal device may determine the random access procedure based on a type of service for which the terminal device is in operation. As described above, the two-step random access procedure may be preferred for time-critical services, for example, Ultra Reliable Low Latency Communications (URLLC) services, New Radio Unlicensed (NRU) services, etc. Therefore, when the terminal service is in a time-critical service, the terminal device may determine to perform the two-step random access procedure. When the terminal device is in a non-time critical service, the terminal device may determine to perform the four-step random access procedure.

In yet another embodiment, the terminal device may determine the random access procedure based on a frequency band on which the terminal device is operating. For example, it may be defined that the two-step random access procedure can be performed in an unlicensed band and the four-step random access procedure can be performed in a licensed band. Thus, when the terminal device is operating in the unlicensed band, the terminal device may determine to perform the two-step random access procedure, thereby reducing the number of Listen Before Talk (LBT) procedures to complete the random access. When the terminal device is operating in the licensed band, the terminal device may determine to perform the four-step random access procedure.

In yet another embodiment, the terminal device may determine the random access procedure based on a number of random access failures. Herein, the random access failure means that the random access is not completed. For example, the terminal device may count a number of random access failures for the two-step random access procedure.

When the number of random access failures reaches a threshold value, (i.e. the random access procedure is not successfully completed even after transmitting msgA for 'N' times, N is a natural number), the terminal device may determine to perform the four-step random access procedure, i.e. only transmitting a PRACH preamble. Alternatively or additionally, the terminal device may count a number of random access failures for the four-step random access procedure. When the number reaches a threshold value, the terminal device may determine to perform the two-step random access procedure. The above threshold values (e.g. N) may be predefined or may be configured via a signaling message by the network node.

In yet another embodiment, the terminal device may determine the random access procedure based on coverage of the network node, such as the base station (e.g. gNB) serving the terminal device. For example, when the coverage of the network node is smaller than a threshold, the terminal device may determine to perform the two-step random access procedure. Otherwise, the four-step random access procedure is determined.

In yet another embodiment, the terminal device may determine the random access procedure based on an availability of a PUSCH resource to be used for the two-step random access procedure. For example, dedicated PUSCH resources may be allocated to the two-step random access procedure. When performing the two-step random access procedure, the terminal device may use an instance of the dedicated PUSCH resources to transmit the PUSCH. If the instance of the dedicated PUSCH resources is determined as being unavailable, e.g. the PUSCH resource is occupied by a higher priority UL transmission or the PUSCH resource is not for a UL subframe, the terminal device may determine to perform the four-step random access procedure. If the instance of the dedicated PUSCH resources is determined as available, the terminal device may determine to perform the two-step random access procedure.

In yet another embodiment, the terminal device may determine the random access procedure based on a moving speed of the terminal device. For example, when the moving speed of the terminal device is lower than a predetermined threshold, the terminal device may determine to perform the two-step random access procedure. Otherwise, the terminal device may determine to perform the four-step random access procedure.

In some embodiments, if the received random access type indication indicates that both two-step random access procedure and four-step random access procedure can be used by the terminal device, the terminal device may further determine the actual random access procedure based on at least one of the factors as described above.

Upon the determination of the random access procedure to be performed, in block 304, the terminal device transmits a request message for random access in/with the determined random access procedure. In some embodiments, if the four-step random access procedure is determined to be used, the terminal device may transmit the request message comprising a preamble, i.e. message 1. If the two-step random access procedure is determined to be used, the terminal device may transmit the request message comprising a preamble and a PUSCH, i.e. message A. In some embodiments, the PUSCH may be of an existing channel structure carrying control and/or data information with DMRS. Alternatively, if the preamble is enough for PUSCH channel estimation, the PUSCH may be of a channel structure carrying control and/or data information without DMRS. In some embodiments, if DMRSs are enough to separate different terminal devices and timing can be estimated accurately, the request message in the two-step random access procedure may not comprise the preamble, that is, the request message may comprise only the PUSCH with the DMRS.

Additionally, in some embodiments, in response to transmitting the request message, the terminal device may receive a response message from the network node, as shown in block 306. In some embodiments, when the request message is message 1 in the four-step random access procedure, the response message will be a RAR (message 2). When the request message is transmitted for the two-step random access procedure, the response message may be message B if the network node determines to perform the two-step random access procedure, or may be message 2 if the network node determines to perform the four-step random access procedure. In the case of receiving message 2, the terminal device may proceed with the four-step random access procedure by transmitting message 3. In some embodiments, when the request message is message A in the two-step random access procedure, the response message may be a message indicating a random access procedure to be used for a subsequent random access. If the network node fails to decode the PUSCH message while successfully detecting the preamble in the request message, the network node may determine a random access procedure for a subsequent random access, and transmit a response message indicating the determined random access procedure. After receiving the response message, the terminal device may know what random access procedure will be used, and use it for the subsequent random access. The determined random access procedure may be indicated by a fallback indication. The fallback indication may be one bit. For example, if the bit is set to 0, it means that the two-step random access procedure is used for the subsequent random access. If the bit is set to 1, it means that the four-step random access procedure is used for the subsequent random access.

In some embodiments, in addition to the fallback indication, the response message may further comprise at least one of the detected preamble, TA information, and a random access failure cause. In an embodiment, the random access failure cause may comprise either of cyclic redundancy check (CRC) failure and low signal quality.

In the two-step random access procedure, the PUSCH transmission is not necessarily with poor UL time alignment even if a timing alignment timer has expired. The terminal device may use the last valid timing alignment timer value to transmit the PUSCH. When the terminal device receives the TA information in the response message, the TA information can be used for the subsequent two-step random access procedure.

In some embodiments, the response message may be received on a physical downlink shared channel, PDSCH. Alternatively, the response message may be received as control information on a physical downlink control channel, PDCCH.

Figure 4:
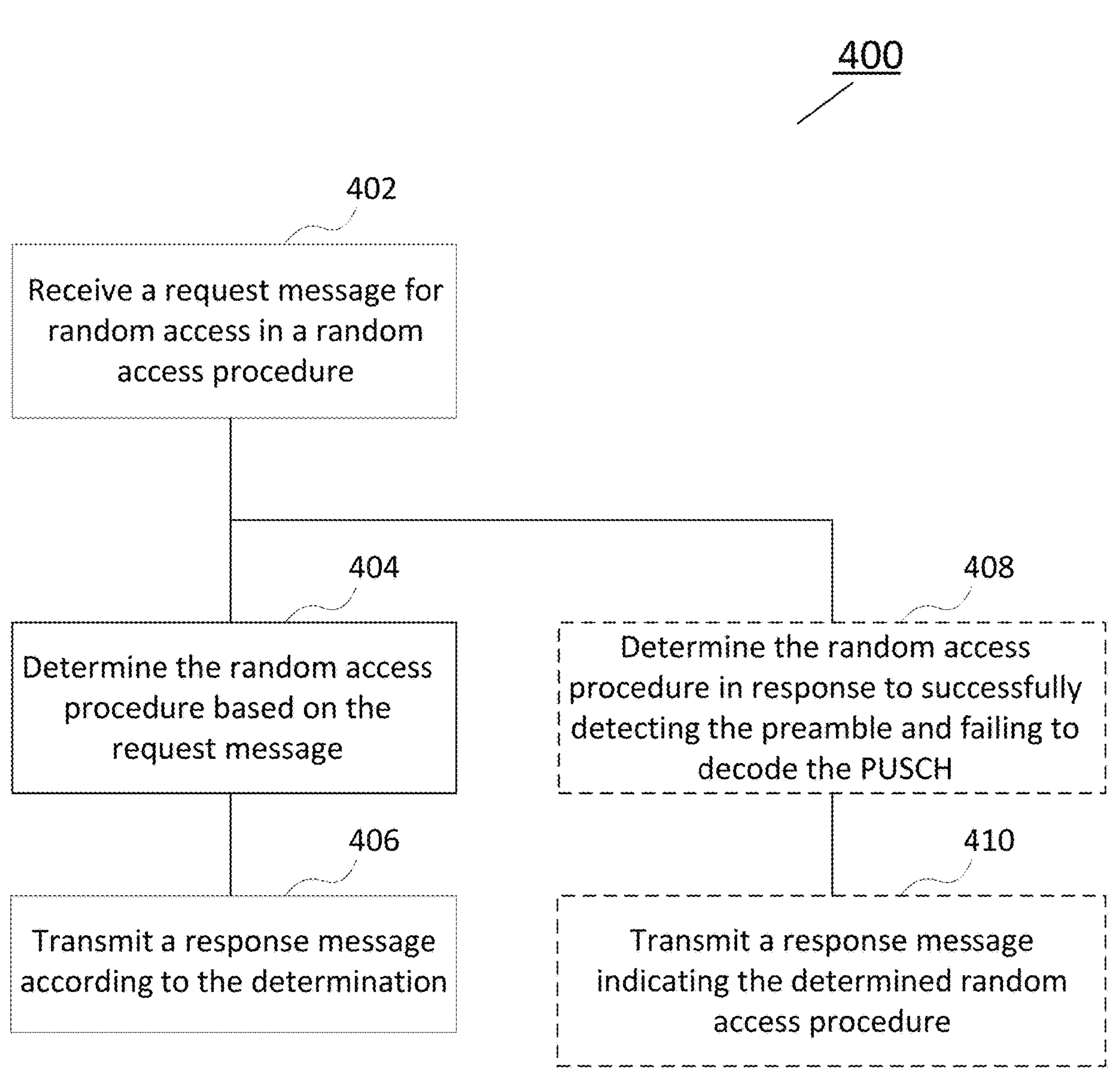
FIG. 4 is a flowchart illustrating a method performed by a network node according to some embodiment of the present disclosure.

FIG. 4 is a flowchart illustrating a method 400 according to some embodiments of the present disclosure. The method 400 illustrated in FIG. 4 may be performed by an apparatus implemented in/as a network node or communicatively coupled to a network node. In accordance with an exemplary embodiment, the network node may be a base station, e.g. a gNB. In the following description with respect to FIG. 4, for the same or similar parts as those in the previous exemplary embodiments, the detailed description will be properly omitted.

According to the exemplary method 400 illustrated in FIG. 4, the network node receives a request message for random access in a random access procedure, as shown in block 402. In the four-step random access procedure, the request message may comprise a preamble without PUSCH. In the two-step random access procedure, the request message may comprise a preamble and a PUSCH with or without DMRS, or the request message may comprise a PUSCH with DMRS.

Then in block 404, the network node determines whether the random access procedure is the two-step random access procedure or the four-step random access procedure based on the received request message. That is, the network node determines to perform what random access procedure.

In some embodiments, the network node may determine whether a PUSCH is received in a PUSCH resource for a two-step random access procedure. As described above, the two-step random access procedure may be allocated with the dedicated PUSCH resources. The terminal device may transmit the PUSCH in an instance of the dedicated PUSCH resources. If the network node determines that the PUSCH is received in the dedicated PUSCH resource, the network node determines that the random access procedure is the two-step random access procedure. Otherwise, if the network node determines that no PUSCH is received in the dedicated PUSCH resource, the network node determines that the random access procedure is the four-step random access procedure.

In some embodiments, the determination of the random access procedure may be based on other one or more factors than the PUSCH resources dedicated for the two-step random access procedure.

In an embodiment, the network node may determine the random access procedure based on a measurement on an uplink signal. For example, the uplink signal may be the preamble in the physical random access channel (PRACH) occasion, or the PUSCH. The network node may measure a signal level or a time offset of the uplink signal. If the signal level or the time offset is lower than a threshold, the network node may determine to perform the two-step random access procedure. Otherwise, the four-step random access procedure is determined. The threshold may be predefined or may be configured via a signaling message.

In another embodiment, the network node may determine the random access procedure based on a frequency band on which the terminal device is operating. For example, as described above, it may be defined that the two-step random access procedure can be performed in an unlicensed band and the four-step random access procedure can be performed in a licensed band. Thus, when the terminal device is operating in the unlicensed band, the network node may determine to perform the two-step random access procedure. When the terminal device is operating in the licensed band, the network node may determine to perform the four-step random access procedure.

In yet another embodiment, the network node may determine the random access procedure based on a number of random access failures. For example, as described above, the network node may count the number of random access failures for the two-step random access procedure. When the number of random access failures reaches a threshold value, the network node may determine to perform the four-step random access procedure. Alternatively or additionally, the network node may count a number of random access failures for the four-step random access procedure. When the number reaches a threshold value, the network node may determine to perform the two-step random access procedure. The threshold value may be predefined or may be pre-configured.

In yet another embodiment, the network node may determine the random access procedure based on its coverage. For example, when the coverage of the network node is smaller than a threshold, the network node may determine to perform the two-step random access procedure. Otherwise, the four-step random access procedure is determined.

In yet another embodiment, the network node may determine the random access procedure based on an availability of a PUSCH resource to be used for the two-step random access procedure. For example, the dedicated PUSCH resources may be allocated to the two-step random access procedure. If the network node determines that the instance of the dedicated PUSCH resources corresponding to the detected preamble in the request message is unavailable, e.g. the PUSCH resource is occupied by a higher priority UL transmission or the PUSCH resource is not for a UL subframe, the network node may determine to perform the four-step random access procedure. If the instance of the dedicated PUSCH resources is determined as available, the network node may determine to perform the two-step random access procedure.

In yet another embodiment, the network node may determine the random access procedure based on a PUSCH decoding status. In particular, if the PUSCH decoding status indicates that the PUSCH decoding is failed, the network node may determine to perform the four-step random access procedure. If the PUSCH decoding status indicates that the PUSCH decoding is successful, the network node may determine to perform the four-step random access procedure. In an embodiment, the PUSCH decoding status may be a CRC status. Moreover, the PUSCH decoding status may be determined according to the number of error bits decoded.

Upon the determination of the random access procedure, in block 406, the network node transmits a response message to the terminal device according to the determination. When the two-step random access procedure is determined, the response message is the RAR (message 2). When the four-step random access procedure is determined, the response is the message B.

Additionally, in some embodiments, if the network node successfully detects the preamble in the request message and fails to decode the PUSCH message, the network node may determine a random access procedure to be used by the terminal device for a subsequent random access, as shown in block 408. In some embodiments, the determination of the random access procedure may be based on at least one of the factors as described above. Then in block 410, the network node may transmit the response message indicating the determined random access procedure to the terminal device. In some embodiments, the determined random access procedure may be indicated by a fallback indication. The fallback indication may be one bit. For example, if the bit is set to 0, it means that the two-step random access procedure is used for the subsequent random access. If the bit is set to 1, it means that the four-step random access procedure is used for the subsequent random access.

In some embodiments, in addition to the fallback indication, the response message may further comprise at least one of the detected preamble, TA information, and a random access failure cause. In an embodiment, the random access failure cause may comprise either of cyclic redundancy check (CRC) failure and low signal quality. In some embodiments, the response message may be transmitted on a PDCCH or a PDSCH.

Additionally, in some embodiments, the network node may transmit a random access type indication to the terminal device. The random access type indication indicates the random access procedure(s) that the terminal device can use. Accordingly, the terminal device can determine the random access procedure to be performed. The details of the random access type indication have been described above, and thus are omitted herein.

Please note that the order for performing the steps as shown in FIG. 4 is illustrated just as an example. In some implementation, some steps may be performed in a reverse order or in parallel. In some other implementation, some steps may be omitted or combined.

It can be therefore seen that, with the proposed solutions for the random access according to the above embodiments, the terminal device and the network node can determine to perform what random access procedure for random access. Moreover, the terminal device and the network node can switch the random access from the two-step random access procedure to the four-step random access procedure or vice versa.

The various blocks shown in FIGS. 3-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
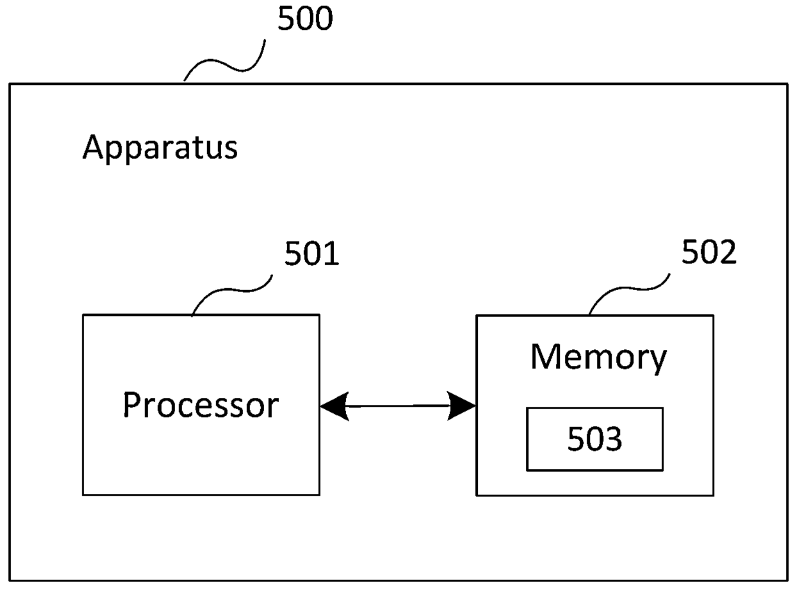
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a terminal device as described with respect to FIG. 3, or a network node as described with respect to FIG. 4.

In some implementations, the one or more memories 502 and the computer program codes 503 may be configured to, with the one or more processors 501, cause the apparatus 500 at least to perform any operation of the method as described in connection with FIG. 3. In such embodiments, the apparatus 500 may be implemented as at least part of or communicatively coupled to the terminal device as described above. As a particular example, the apparatus 500 may be implemented as a terminal device.

In other implementations, the one or more memories 502 and the computer program codes 503 may be configured to, with the one or more processors 501, cause the apparatus 500 at least to perform any operation of the method as described in connection with FIG. 4. In such embodiments, the apparatus 500 may be implemented as at least part of or communicatively coupled to the network node as described above. As a particular example, the apparatus 500 may be implemented as a network node.

Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6:
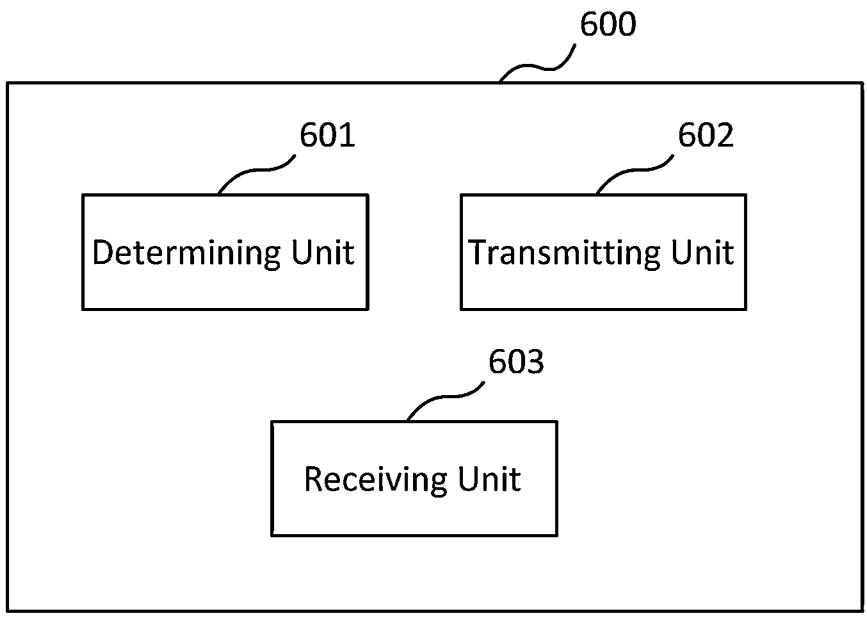
FIG. 6 is a block diagram illustrating an apparatus according to some embodiments of the present disclosure.

FIG. 6 is a block diagram illustrating an apparatus 600 according to some embodiments of the present disclosure. As shown in FIG. 6, the apparatus 600 may comprise a determining unit 601 and a transmitting unit 602. In an exemplary embodiment, the apparatus 600 may be implemented in a terminal device such as UE. The determining unit 601 may be operable to carry out the operation in block 302. The transmitting unit 602 may be operable to carry out the operation in block 304. Further, the apparatus 600 may also comprise a receiving unit 603 operable to carry out the operation in block 306. Optionally, the determining unit 601, the transmitting unit 602 and/or the receiving unit 603 may be operable to carry out more or less operations to implement the proposed methods according to the exemplary embodiments of the present disclosure.

Figure 7:
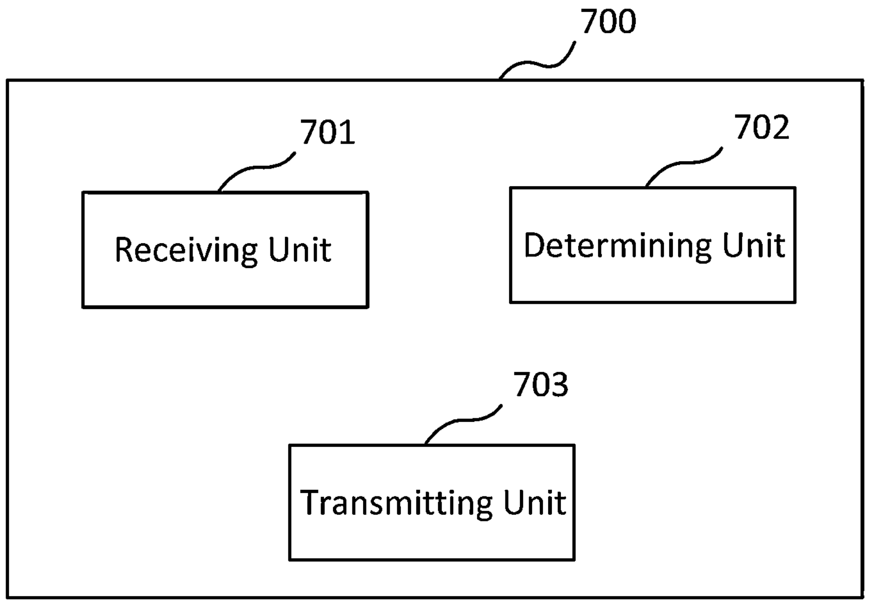
FIG. 7 is a block diagram illustrating an apparatus according to some embodiments of the present disclosure.

FIG. 7 is a block diagram illustrating an apparatus 700 according to some embodiments of the present disclosure. As shown in FIG. 7, the apparatus 700 may comprise a receiving unit 701, a determining unit 702, and a transmitting unit 703. In an exemplary embodiment, the apparatus 700 may be implemented in a network node such as a base station (e.g. a gNB, or an eNB). The receiving unit 701 may be operable to carry out the operation in block 402. The determining unit 702 may be operable to carry out the operation in blocks 404, 408, and the transmitting unit 703 may be operable to carry out the operation in blocks 406, 410. Optionally, the receiving unit 701, the determining unit 702 and/or the transmitting unit 703 may be operable to carry out more or less operations to implement the proposed methods according to the exemplary embodiments of the present disclosure.

Figure 8:
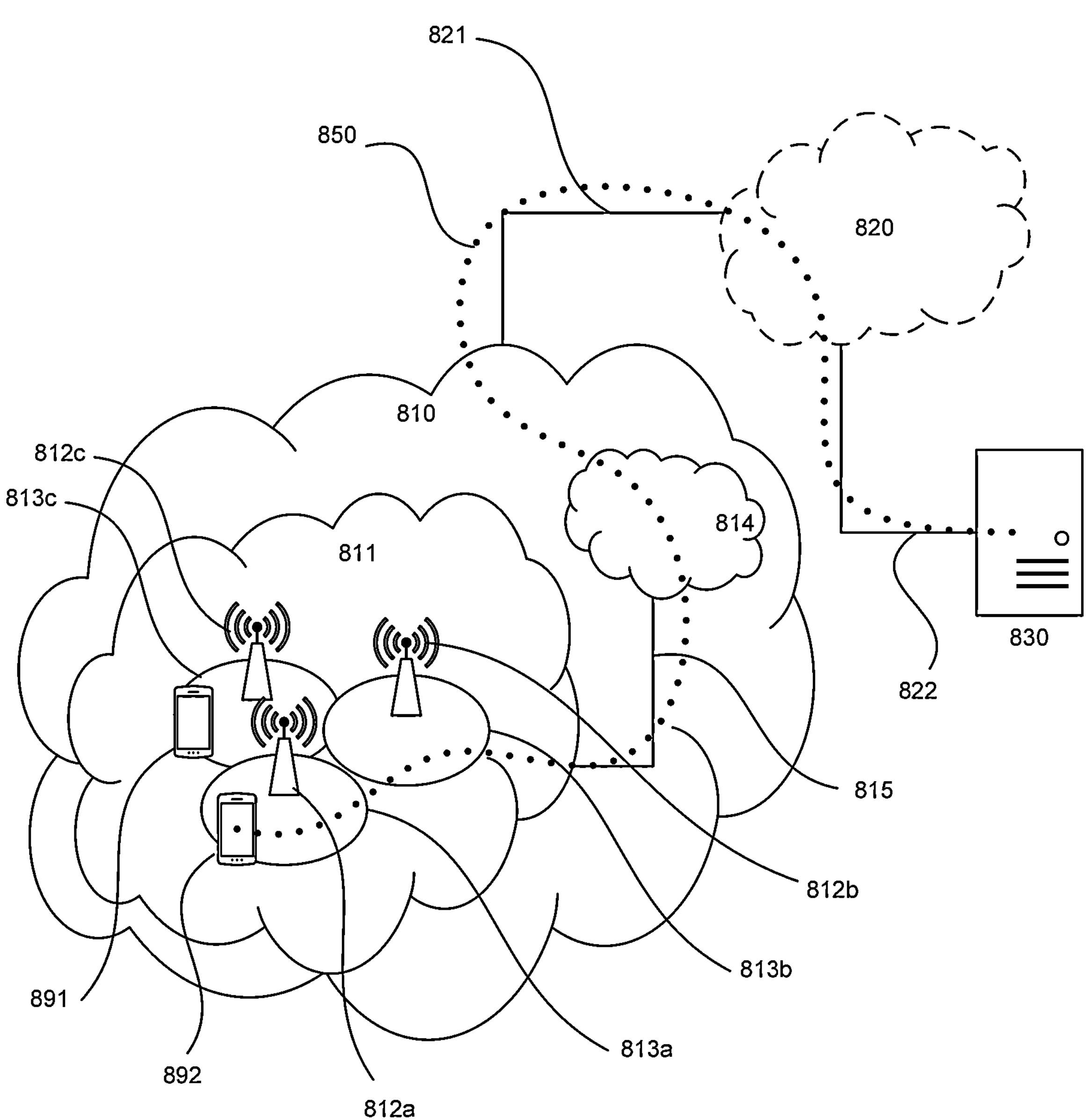
FIG. 8 is a block diagram illustrating a telecommunication network connected via an intermediate network to a host computer in accordance with some embodiments of the present disclosure.

FIG. 8 is a block diagram illustrating a telecommunication network connected via an intermediate network to a host computer in accordance with some embodiments of the present disclosure.

With reference to FIG. 8, in accordance with an embodiment, a communication system includes a telecommunication network 810, such as a 3GPP-type cellular network, which comprises an access network 811, such as a radio access network, and a core network 814. The access network 811 comprises a plurality of base stations 812*a*, 812*b*, 812*c*, such as NBs, eNBs, gNBs or other types of wireless access points, each defining a corresponding coverage area 813*a*, 813*b*, 813*c*. Each base station 812*a*, 812*b*, 812*c* is connectable to the core network 814 over a wired or wireless connection 815. A first UE 891 located in a coverage area 813*c* is configured to wirelessly connect to, or be paged by, the corresponding base station 812*c*. A second UE 892 in a coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Figure 9:
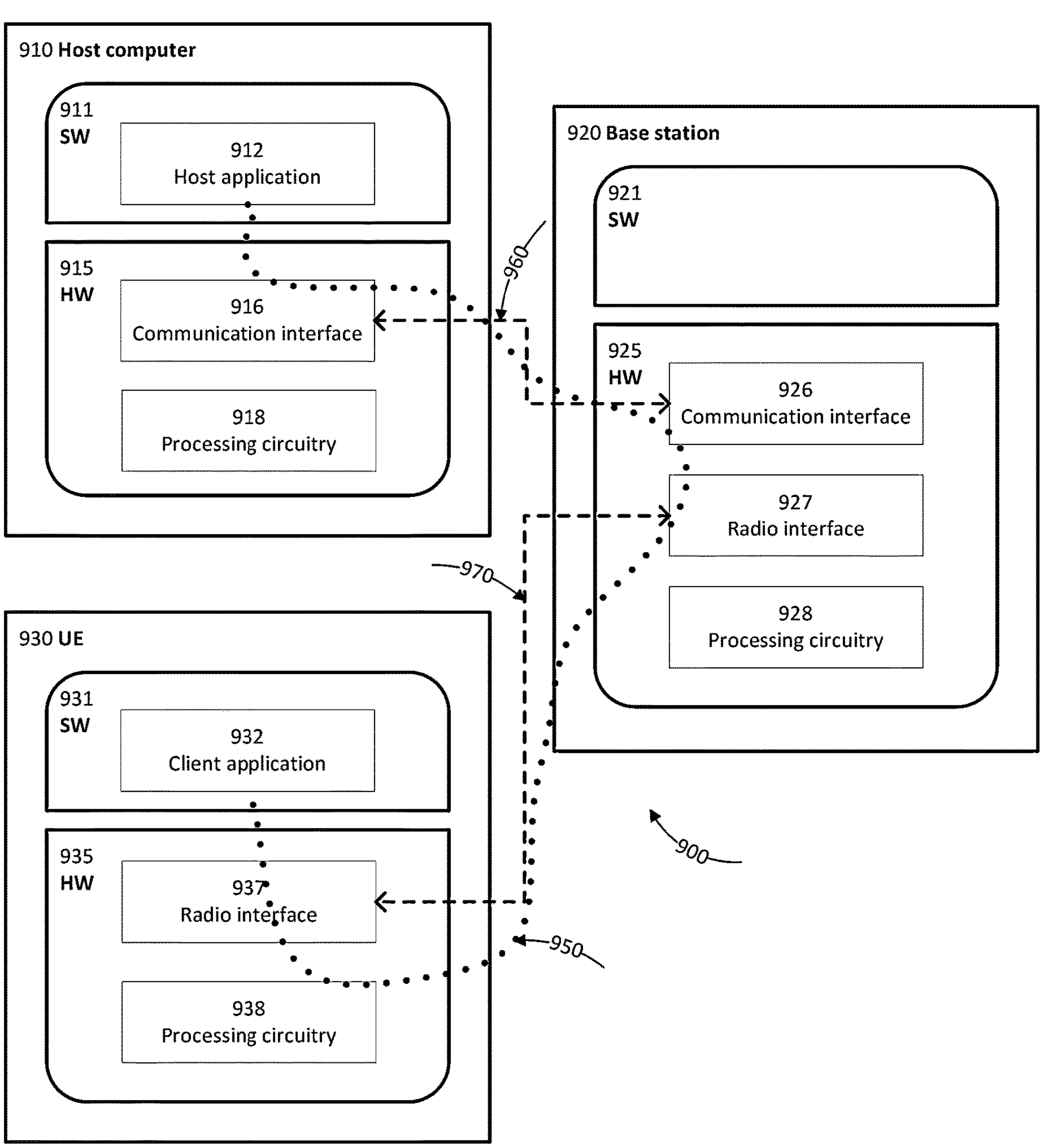
FIG. 9 is a block diagram illustrating a host computer communicating via a base station with a UE over a partially wireless connection in accordance with some embodiments of the present disclosure.

FIG. 9 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

It is noted that the host computer 910, the base station 920 and the UE 930 illustrated in FIG. 9 may be similar or identical to the host computer 830, one of base stations 812*a*, 812*b*, 812*c* and one of UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

Figure 10:
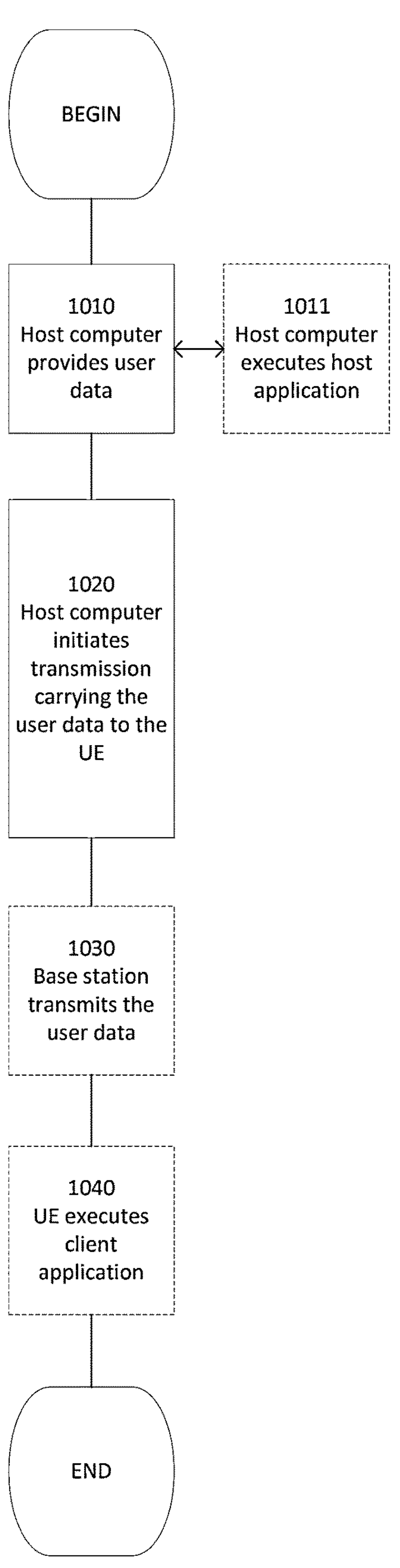
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 10 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 11:
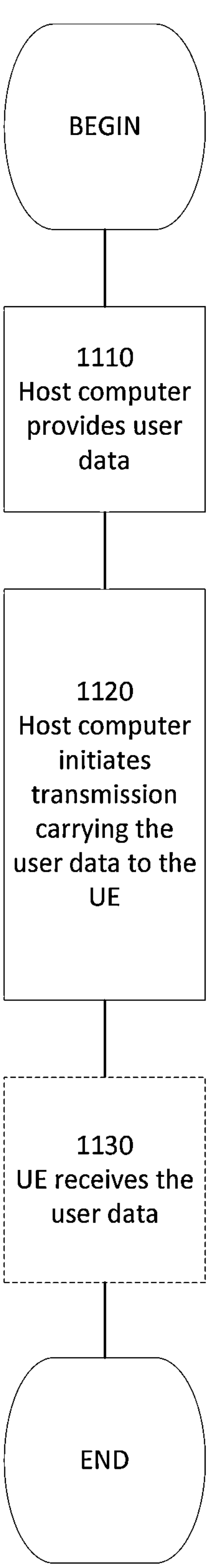
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 11 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 12:
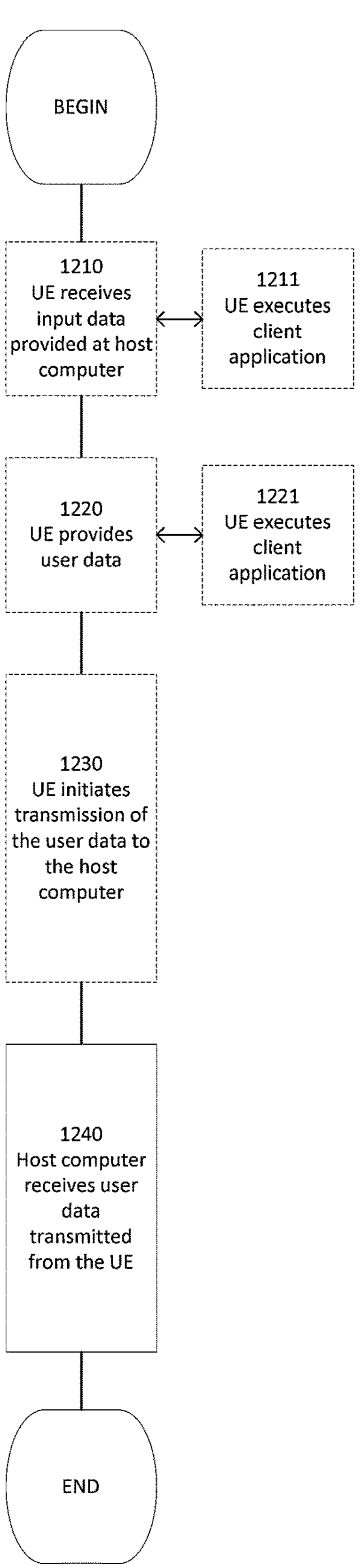
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 12 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 13:
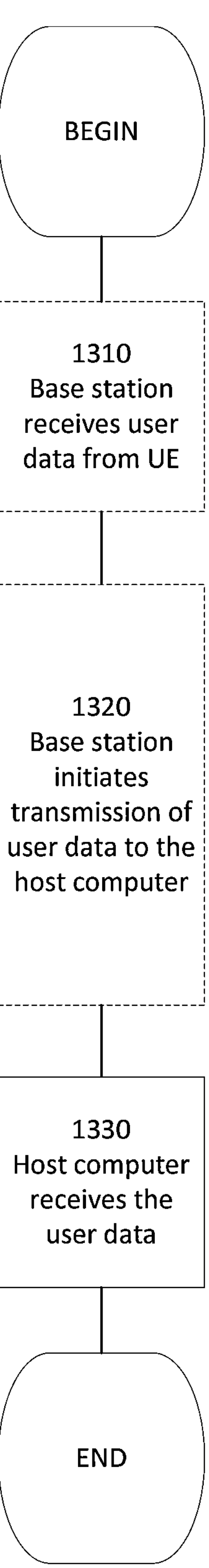
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 8 and FIG. 9. For simplicity of the present disclosure, only drawing references to FIG. 13 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device comprising:

determining a random access procedure to be performed, wherein the random access procedure is one of a two-step random access procedure and a four-step random access procedure, wherein the random access procedure to be performed is determined according to a random access type indication received from a network node via radio resource control (RRC) signaling and wherein the random access type indication indicates that both the two-step random access procedure and the four-step random access procedure can be used by the terminal device; and transmitting a request message for random access in the determined random access procedure.

2. The method according to claim 1, wherein when the random access procedure to be performed is determined as the two-step random access procedure, the request message comprises a preamble and a physical uplink shared channel (PUSCH).

3. The method according to claim 1, wherein when the random access procedure to be performed is determined as the two-step random access procedure, the request message comprises a physical uplink shared channel (PUSCH) with a demodulation reference signal (DMRS).

4. The method according to claim 3, wherein the PUSCH is of a channel structure carrying information with or without the DMRS.

5. The method according to claim 1, wherein the random access procedure to be performed is determined based on at least one of: a measurement on a downlink signal or channel, a type of service for which the terminal device is in operation, a frequency band on which the terminal device is operating, a number of random access failures, a coverage of a network node, an availability of a physical uplink shared channel (PUSCH) resource to be used for the two-step random access procedure, and a moving speed of the terminal device.

6. The method according to claim 1, further comprising:

receiving, in response to transmitting the request message, a response message from a network node, the response message indicating a random access procedure to be used by the terminal device for a subsequent random access.

7. The method according to claim 6, wherein the response message further comprises at least one of: a preamble in the request message, timing advance (TA) information, and a random access failure cause.

8. The method according to claim 7, wherein the TA information is used for a subsequent two-step random access procedure.

9. The method according to claim 7, wherein the response message is received on a physical downlink shared channel (PDSCH) or a physical downlink control channel (PDCCH).

10. A method performed by a network node comprising:

transmitting a random access type indication to a terminal device via radio resource control (RRC) signaling, wherein the random access type indication indicates that both a two-step random access procedure and a four-step random access procedure can be used; and receiving, from a terminal device, a request message for random access in the two-step random access procedure or the four-step random access procedure.

11. The method according to claim 10 further comprising:

determining whether the random access procedure is the two-step random access procedure or the four-step random access procedure based on the request message; and transmitting, to the terminal device, a response message according to the determination.

12. The method according to claim 11, wherein determining whether a random access procedure is the two-step random access procedure or the four-step random access procedure based on the request message comprises:

determining whether a physical uplink shared channel (PUSCH) is received in a PUSCH resource for a two-step random access procedure;

determining, in response to the determination that the PUSCH is received in the PUSCH resource for the two-step random access procedure, that the random access procedure is the two-step random access procedure; and determining, otherwise, that the random access procedure is the four-step random access procedure.

13. The method according to claim 12, further comprising:

determining, in response to successfully detecting a preamble in the request message and failing to decode a PUSCH in the request message, a random access procedure to be used by the terminal device for a subsequent random access; and transmitting the response message indicating the determined random access procedure.

14. The method according to claim 12, wherein the random access procedure is determined based on at least one of: a measurement on an uplink signal, a frequency band on which the terminal device is operating, a number of random access failures, a coverage of the network node, an availability of a PUSCH time-frequency resource to be used for a two-step random access procedure, and a PUSCH decoding status.

15. The method according to claim 14, wherein the response message further comprises at least one of a preamble in the request message, timing advance (TA) information, and a random access failure cause.

16. A terminal device comprising:

one or more processors; and one or more memories comprising computer program codes, the one or more memories and the computer program codes configured to, with the one or more processors, cause the terminal device to:

determine a random access procedure to be performed, wherein the random access procedure is one of a two-step random access procedure and a four-step random access procedure, wherein the random access procedure to be performed is determined according to a random access type indication received from a network node via radio resource control (RRC) signaling and wherein the random access type indication indicates that both the two-step random access procedure and the four-step random access procedure can be used by the terminal device; and transmit a request message for random access in the determined random access procedure.

* * * * *